Figure 1B:
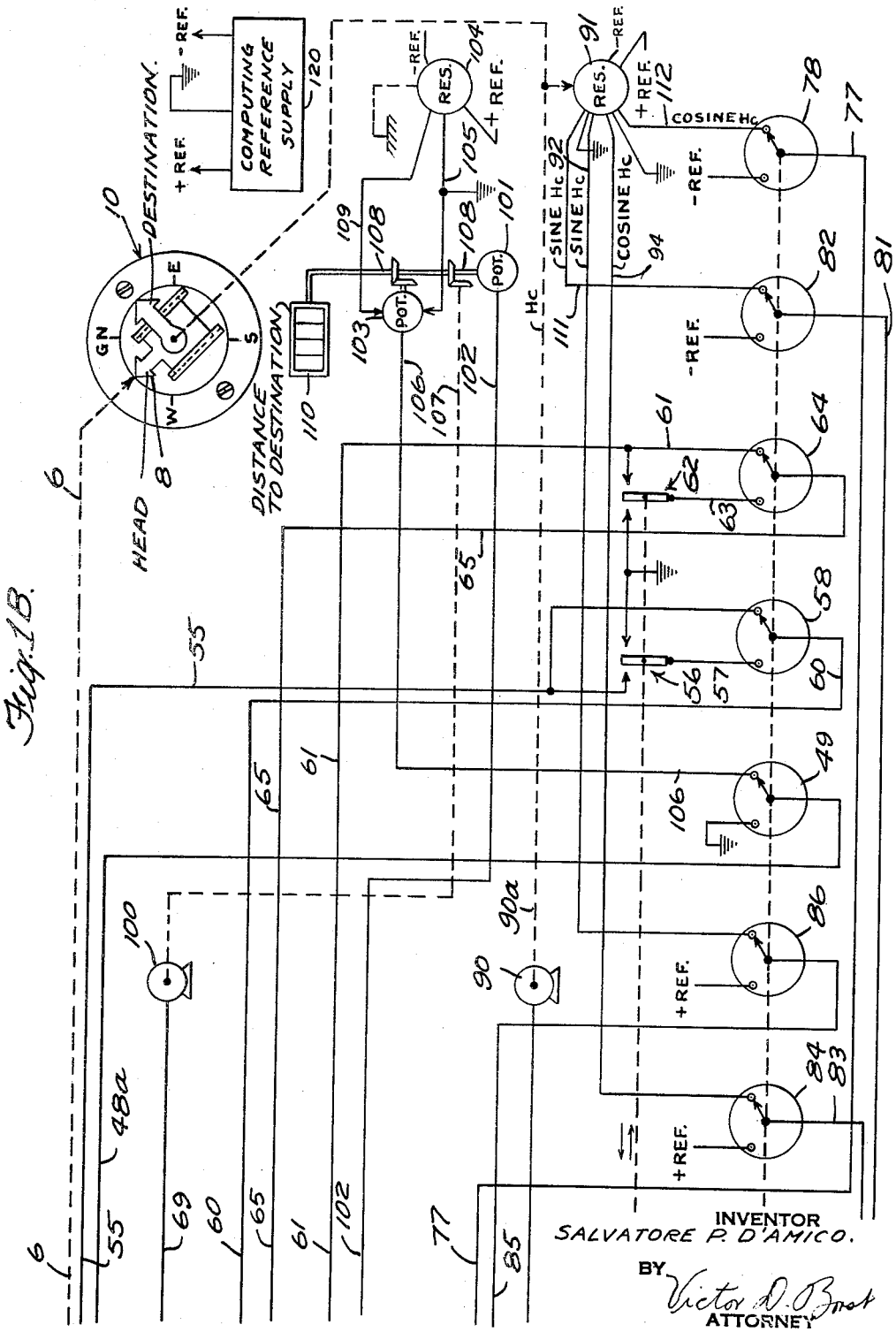

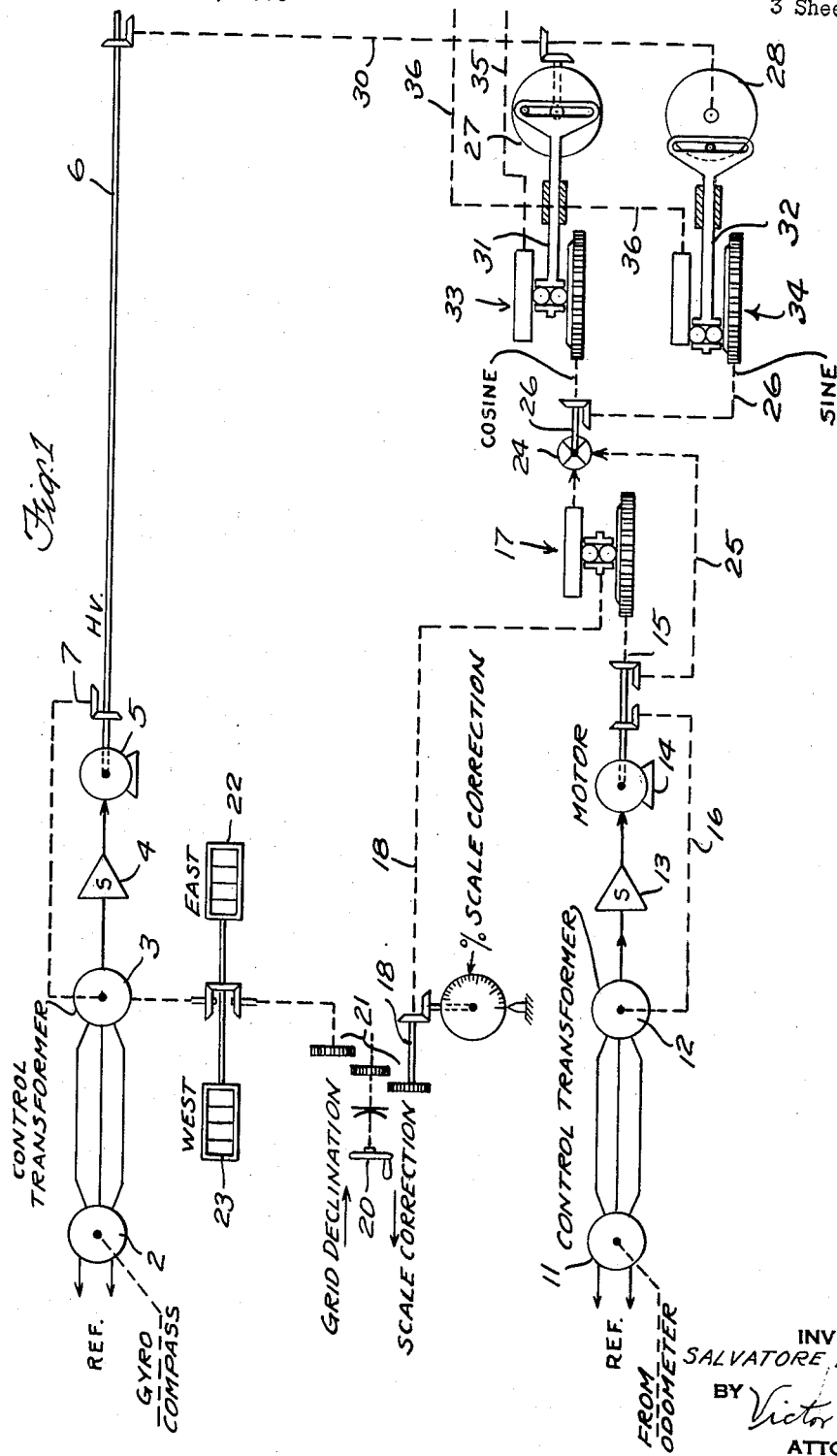

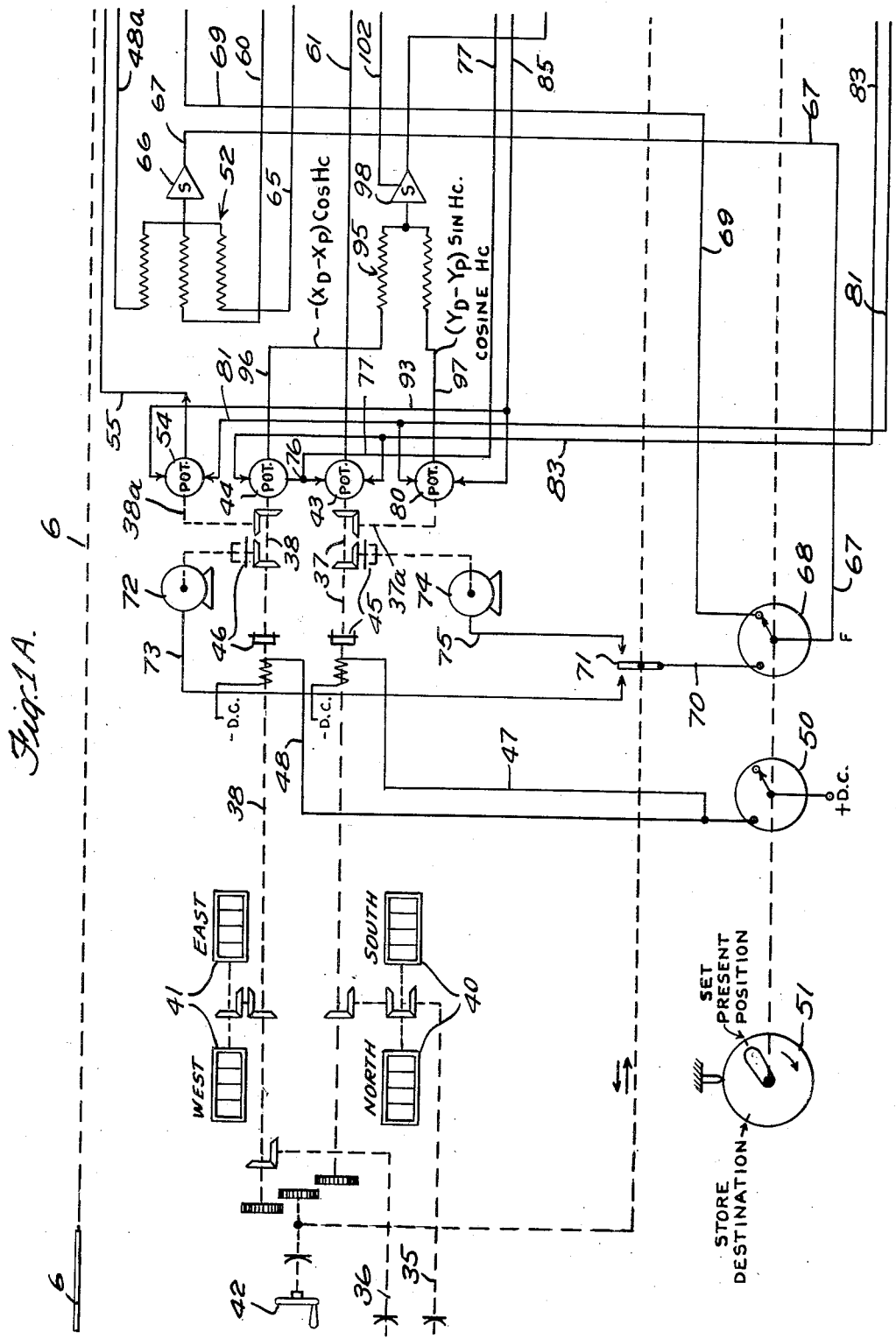

INVENTOR
SALVATORE P. D'AMICO.
BY Victor D. Brot
ATTORNEY

United States Patent Office 3,024,996
Patented Mar. 13, 1962

3,024,996
VEHICLE NAVIGATIONAL COMPUTER
Salvatore P. D'Amico, Merrick, N.Y., assignor to Sperry Rand Corporation, Ford Instrument Company Division, Wilmington, Del., a corporation of Delaware
Filed Oct. 8, 1958, Ser. No. 765,987
7 Claims. (Cl. 235—187)

This invention relates to navigational computers adapted to be carried aboard vehicles and to yield steering information to a preset destination. In general, the computer consists of a combination of computing units arranged to compute and display navigation information in polar coordinates derived from corresponding values which are referenced in rectangular coordinates. To this end, the system affords means for continuously generating vehicle positions referenced to arbitrary or non-steering positions so that present positions may be continuously indicated. In addition, the system provides an arrangement of components which are responsive to the continuously generated present position and preset destination in order that the distance to destination may be continuously indicated.

One object of the invention is to provide means for computing and displaying present position of a vehicle which has arbitrarily, in fact, begun its journey anywhere on the surface of the earth.

Another object of the invention is to provide means for indicating navigation values representing distance to destination and steering values in terms of angular or polar units which will afford the operator a unique facility for directing the vehicle to its destination by the relatively easy process of causing the vehicle heading and the steering values indicators to coincide.

Other objects and advantages of the invention will be appreciated upon reading the following description which is taken in conjunction with the accompanying drawings, in which FIGS. 1, 1A and 1B jointly illustrate the arrangement of computing units constituting the navigation device.

Referring to FIG. 1, a synchro generator 2 is associated with a true North-South seeking gyro compass, not shown, being thereby adapted to yield azimuth information and is connected to a control transformer 3 which receives the azimuth values and transmits them as analog voltages through a servo amplifier 4 to servo motor 5. The armature shaft 6 of the servo motor is connected to feedback shaft 7 which serves to drive the control transformer and null the output of the latter when the full output of the synchro generator is introduced to the armature shaft 6 as vehicle heading angle Hv.

The armature shaft is mechanically linked with the vehicle heading angle indicator 8 of the direction to destination device 10 causing the vehicle heading angle indicator to turn proportionately with the azimuth values continuously generated by the gyro compass.

Similarly, distance information is received electrically from a synchro generator 11 driven by a vehicle odometer, not shown. The electrical signal corresponding to vehicle distance travelled is servoed through the control transformer 12, the servo amplifier 13 and motor 14 to armature shaft 15 which is connected by feedback shaft 16 to the control transformer 12. The armature shaft 15 is employed to drive a disc of variable speed device 17, the ball carriage of which is mechanically positioned by shaft 18 and knob 20 which provides means for setting into the device a correction of the distance data to compensate for tire wear and discrepancies in odometer scaling. The knob 20 is also adapted to be connected to the control transformer 3 through gear train 21 so that adjustment of the latter for grid declination may be made the value for this correction being displayed on East and West counters 22 and 23, respectively. Because variable speed devices are less accurate when their ball carriages are positioned near the center, the scale correction shaft 18 is set so that the carriage is located off center at zero distance. This correction factor is compensated by differential 24 which is connected to the output of the variable speed device 17 and to the shaft 15 by means of compensation shaft 25.

The output of the differential on spider shaft 26 then represents quantities corresponding to distance travelled. These quantities are resolved into North-South, East-West components of distance as follows: cosine and sine resolvers 27 and 28, respectively, are driven by the vehicle heading shaft 6 through shaft 30, and resolver output yokes 31 and 32 of the cosine and sine resolvers serve to locate the ball carriages of variable speed devices 33 and 34, respectively, the discs of which are driven by the shaft 26. Polar output shafts 35 and 36 of the variable speed devices 33 and 34, respectively, are in driving connection with North-South shaft 37 and East-West shaft 38, respectively. Counters 40 and 41 are driven by the shafts 37 and 38, respectively. The counters are arranged to be preset for establishing a reference for distance travelled by means of knob 42 and the shafts 37 and 38. The continuously generated values for distance travelled are, therefore, related to the preset values established by the reference position and cranked in by the knob 42.

The shafts 37 and 38 are also connected to potentiometers 43 and 44, respectively, through clutches 45 and 46, these clutches being connectable by lines 47 and 48, respectively, to the line through switch 50. The switch 50 is mechanically ganged to a system operating unit 51 which is adapted to connect the clutches to the line when the operator is placed in the position designated storage destination so that the energized clutches are opened to break the connection between the counters and the potentiometers to permit the latter to be centered to zero position. Adding network 52 has one leg connected to potentiometer 54 through line 55, contact switch 56, which is operated by the crank 42, lead 57, switch 58, which is ganged to the operator 51 and lead 60. Similarly, the potentiometer 43 is connected to another leg of the adding network 52 by means of potentiometer output lead 61, contact switch 62, lead 63, ganged switch 64 and network input lead 65. The third leg of the adding network 52 is grounded through lead 48a and ganged switch 49 when the operator is in storage destination position. The other side of the adding network 52 is connected to a servo amplifier 66, the output of which on lead 67 is placed across ganged switch 68 and then to lead 70, contact switch 71 and to motor 72 on motor energizing lead 73 or selectively to motor 74 on motor energizing lead 75 according to the position of the contact switch 71 as set by the knob 42. The potentiometers 43 and 44 are negatively referenced by common lead 76, lead 77 and ganged switch 78 while potentiometers 54 and 80 are negatively referenced by virtue of their connection to lead 81 and the ganged switch 82. At the same time, the potentiometers 43 and 44 are positively referenced when the operator is in storage destination position as a consequence of their connection to lead 83 and ganged switch 84 while potentiometers 54 and 80 are positively referenced by virtue of their connection to leads 85, 93 and ganged switch 86. The potentiometers 54 and 80 are mechanically driven with the potentiometers 44 and 43, respectively, by virtue of their connection to shafts 38 and 37 by shafts 38a and 37a, respectively. Hence, as a consequence of selectively placing the potentiometers in a servoing loop, the potentiometers may be automatically centered to the zero position on operation of the crank 42 and the operator 51 and while the clutches 45 and 46 are thus connected into the line the connection between the counters and potentiometers are broken so that the desired destination coordinates may be cranked into the counters.

On setting the operator to set present position, the clutches 45 and 46 are then deenergized and closed so that the counters are linked to the potentiometers. It is then apparent that as the preset position values are set into the shafts 37 and 38 in order to change the desired destination coordinates in the counters to present position coordinates, the effective quantity cranked into the potentiometers actually represents the difference between the destination and present position coordinates, the output of the variable speed devices 33 and 34 serving to change the destination of coordinates as the distance thereto is reduced. Potentiometers 44 and 54 may be designated the East-West distance to destination from present position potentiometers while the potentiometers 43 and 80 are the North-South distance potentiometers.

The balance of the system is employed to effect coordinate conversion from rectangular to polar distances by accepting the rectangular coordinate distance between destination and present position on the potentiometers and resolving them into a range and angle as follows: The output of servo motor 90 is placed on shaft 90a and into sine and cosine resolver 91 which is connected back to the potentiometer section by lead 92, ganged switch 86 and to potentiometer leads 85 and 93 in order to introduce the sine of the servo output, polar compass heading $H_c$, to one side of the potentiometers 54 and 80, respectively. The resolver 91 also puts quantity sine $H_c$ into the other side of the potentiometers 54 and 80 by means of lead 111, the ganged switch 82 and the lead 81. On the other hand, resolver lead 94 introduces the cosine $H_c$ of the servo output to one side of the potentiometers 43 and 44 by virtue of its being selectively connectable to those potentiometers through the ganged switch 84 and the lead 83 while resolver lead 112, the ganged switch 78 and the lead 77 serve to place the quantity cosine $H_c$ into the other side of the potentiometers 43 and 44. Adding network 95 receives the output of the potentiometers 44 and 80 on leads 96 and 97. The lead 96 carries the quantity $-(X_d-X_p) \cos H_c$ and output lead 97 conveys the quantity $(Y_d-Y_p) \sin H_c$, the symbols X and Y being the rectangular coordinate quantities and the subscripts $d$ and $p$ representing destination and present position. The combined quantities are used to control servo amplifier 98 which operates the motor 90, the output of which is compass heading $H_c$ when the servo loop is nulled. By simple triangulation it can be shown that the quantities $-(X_d-X_p) \cos H_c$ and $(Y_d-Y_p) \sin H_c$ are arithmetically equal when $H_c$ represents true heading. Hence, when this obtains the described servo system is zeroed. The angle $H_c$ is conveyed on the shaft 90a to the direction to destination unit 8 wherein it is displayed concentrically with the vehicle heading angle against a circular dial on which the compass points are displayed by maneuvering the vehicle so that the vehicle pointer and the destination pointer coincide when the driver reaches its prestored destination. With the operator still set in present position, the servo amplifier 66 is connected by lead 67 through the ganged switch 68, and lead 69 to the servo motor 100 which serves by shafts 107 and 108 to position potentiometer 101 connected to the amplifier 98 by lead 102 and also to position potentiometer 103 which is energized by referenced resolver 104 by leads 105 and 109. The potentiometer 103 is connected back to the adding network 52 by means of feedback lead 106, the ganged switch 49 which is connected to the third leg of the adding network 52 by the lead 48a. The nulling of the servo loop which includes the ganged switch 49 results in a true quantity representing distance which is placed on servo motor output shafts 107 and 108. A distance to destination counter 110 is operatively connected to the shaft 108 and provides continuous indication distance to destination values.

A computing reference supply 120 supplies the plus (+) and (−) reference voltages for this system and also supplies a neutral position or zero potential reference position.

Various modifications in the described system may be effected by persons skilled in the art without departing from the principle and scope of invention as described in the appended claims.

What is claimed is:

1. A vehicle navigational computer comprising two pairs of potentiometers, position counters, selectively connecting means by which said counters are adapted to be selectively connected to said potentiometers, the selectively connecting means including means for automatically zero setting said potentiometers when the selective connection between the position counters and said potentiometers is broken, shafts connected to said counters by means of which said counters are settable in accordance with East-West, North-South rectangular coordinates of destination and East-West, North-South rectangular coordinates of starting position, a system in driving connection with said shafts for continuously feeding quantities representing change of position to said counters, and a computing and indicating system connected to the output of said potentiometers for computing and indicating in polar coordinates quantities representing range to destination and compass heading angle.

2. A vehicle navigational computer comprising two pairs of potentiometers, position counters, selectively connecting means by which said counters are adapted to be selectively connected to said potentiometers, the selectively connecting means including means for automatically zero setting said potentiometers when the selective connection between the position counters and said potentiometers is broken, shafts connected to said counters by means of which said counters are settable in accordance with East-West, North-South rectangular coordinates of destination and East-West, North-South rectangular coordinates of starting position, a system in driving connection with said shafts for continuously feeding quantities representing change of position to said counters, said system including vehicle heading and vehicle distance traveled feeding components, and a computing and indicating system connected to the output of said potentiometers for computing and indicating in polar coordinates quantities representing range to destination and compass heading angle, the compass heading angle indicator having a direction to destination device comprising a pair of rotatively concentric indicators, one of said indicators being controlled by said potentiometers and the other of said indicators being in driving connection with the vehicle heading feeding components of said first mentioned system.

3. A vehicle navigational computer comprising two pairs of potentiometers, position counters, selectively connecting means by which said counters are adapted to be selectively connected to said potentiometers, the selectively connecting means including means for automatically zero setting said potentiometers when the selective connection between the position counters and said potentiometers is broken, shafts connected to said counters by means of which said counters are settable in accordance with East-West, North-South rectangular coordinates of destination and East-West, North-South rectangular coordinates of starting position, a system in driving connection with said shafts for continuously feeding quantities representing change of position to said counters, said system including vehicle heading and vehicle distance traveled feeding components, and a computing and indicating system connected to the output of said potentiometers for computing and indicating in polar coordinates quantities representing range to destination and compass heading angle, the compass heading angle indicator having a direction to destination device comprising a pair of rotatively concentric indicators, one of said indicators being controlled by said potentiometers and the other of said indicators being in driving connection with the vehicle heading feeding components of said first mentioned system, wherein said vehicle heading feeding components comprising an electro-mechanical receiving and transmitting system adapted to receive electrical heading signals as from a gyro compass, a cosine computer, a sine computer, said computers being connected to said electro-mechanical system, a pair of variable speed devices, each of said variable speed devices having ball carriage and disc elements, each ball carriage being located by virtue of its connection to the output side of one of the computers, a second electro-mechanical receiving and transmitting system adapted to receive distance signals as from an odometer, said electro-mechanical system being in driving connection with the discs of said variable speed devices whereby said variable speed devices are adapted to feed separately to said shafts values according to change of position.

4. A vehicle navigational computer as claimed in claim 3 wherein there is provided means for inserting corrections for grid declination in the first mentioned electro-mechanical system and for scale correction in the connection between the second electro-mechanical system and said integrators.

5. A vehicle navigational computer comprising two pairs of potentiometers, position counters, selectively connecting means by which said counters are adapted to be selectively connected to said potentiometers, the selectively connecting means including means for zero setting said potentiometers, shafts connected to said counters by means of which said counters are settable in accordance with East-West, North-South rectangular coordinates of destination and East-West, North-South rectangular coordinates of starting position, a system in driving connection with said shafts for continuously feeding quantities representing change of position to said counters, said system including vehicle heading and vehicle distance traveled feeding components, and a computing and indicating system connected to the output of said potentiometers for computing and indicating in polar coordinates quantities representing range to destination and compass heading angle, said computing and indicating system having a sine and cosine resolver, one pair of the potentiometers being selectively connected to the sine output side of said resolver and the other pair of potentiometers being selectively connected to the cosine output side of said resolver, a servo motor in driving control of said resolver and adding network in control of said servo motor, one leg of said adding network being connected to one potentiometer of the said one pair of potentiometers and the other leg of said adding network being connected to one potentiometer of the said other pair of the potentiometers, whereby said two potentiometers, said adding network, said servo motor and said resolver constituting a servo loop system adapted to yield a true value for compass heading when the servo loop is nulled and the compass heading angle indicator having a direction to destination device comprising a pair of rotatively concentric indicators, one of said indicators being controlled by said servo motor and the other of said indicators being in driving connection with the vehicle heading feeding components of said first mentioned system.

6. A vehicle navigational computer comprising two pairs of potentiometers, position counters, selectively connecting means by which said counters are adapted to be selectively connected to said potentiometers, the selectively connecting means including means for zero setting said potentiometers, shafts connected to said counters by means of which said counters are settable in accordance with East-West, North-South rectangular coordinates of destination and East-West, North-South rectangular coordinates of starting position, a system in driving connection with said shafts for continuously feeding quantities representing change of position to said counters, said system including vehicle heading and vehicle distance traveled feeding components, and a computing and indicating system connected to the output of said potentiometers for computing and indicating in polar coordinates quantities representing range to destination and compass heading angle, said computing and indicating system having a sine and cosine resolver, one pair of the potentiometers being selectively connected to the sine output side of said resolver and the other pair of the potentiometers being selectively connected to the cosine output side of said resolver, a servo motor in driving control of said resolver and adding network in control of said servo motor, one leg of said adding network being connected to one potentiometer of the said one pair of potentiometers and the other leg of said adding network being connected to one potentiometer of the said other pair of the potentiometers, whereby said two potentiometers, said adding network, said servo motor and said resolver constituting a servo loop system adapted to yield a true value for compass heading when the servo loop is nulled, the compass heading angle indicator having a direction to destination device comprising a pair of rotatively concentric indicators, one of said indicators being controlled by said servo motor and the other of said indicators being in driving connection with the vehicle heading feeding components of said first mentioned system and the range to destination computer and indicator comprising a second servo loop comprising a second adding network, one leg of said second adding network being selectively connected to the other potentiometer of the said one pair of potentiometers, a second leg of said second adding network being selectively connected to the other potentiometer of the said other pair of potentiometers, a second servo motor, said second adding network being in selective control of said second servo motor and means for selectively connecting the output side of said second servo motor to the third leg of said second adding network and a distance to destination indicator in driving connection with the latter selective connecting means.

7. A vehicle navigational computer comprising two pairs of potentiometers, position counters, selectively connecting means by which said counters are adapted to be selectively connected to said potentiometers, the selectively connecting means including means for zero setting said potentiometers, shafts connected to said counters by means of which said counters are settable in accordance with East-West, North-South rectangular coordinates of destination and East-West, North-South rectangular coordinates, of starting position, a system in driving connection with said shafts for continuously feeding quantities representing change of position to said counter, said system including vehicle heading and vehicle distance traveled feeding components, and a computing and indicating system connected to the output of said potentiometers for computing and indicating in polar coordinates quantities representing range to destination and compass heading angle, said computing and indicating system having a sine and cosine resolver, one pair of the potentiometers being selectively connected to the sine output side of said resolver and the other pair of the potentiometers being selectively connected to the cosine output side of said resolver, a servo motor in driving control of said resolver and adding network in control of said servo motor, one leg of said adding network being connected to one potentiometer of the said one pair of potentiometers and the other leg of said adding network being connected to one potentiometer of the said other pair of the potentiometers, whereby said two potentiometers, said adding network, said servo motor and said resolver constituting a servo loop system adapted to yield a true value for compass heading when the servo loop is nulled, the compass heading angle indicator having a direction to destination device comprising a pair of rotatively concentric indicators, one of said indicators being controlled by said servo motor and the other of said indicators being in driving connection with the vehicle heading feeding components of said first mentioned system and the range to destination computer and indicator comprising a second servo loop comprising a second adding network, one leg of said second adding network being selectively connected to the other potentiometer of the said one pair of potentiometers, a second leg of said second adding network being selectively connected to the other potentiometer of the said other pair of potentiometers, a second servo motor, said second adding network being in selective control of said second servo motor and means for selectively connecting the output side of said second servo motor to the third leg of said second adding network and a distance to destination indicator in driving connection with the latter selective connecting means, the means for zero setting said potentiometers comprising a third servo loop for zero setting said first pair of potentiometers and a servo loop for zero setting said other pair of potentiometers, said first mentioned servo loop comprising said second adding network, a third servo motor in mechanical driving connection with two of the potentiometers and a fourth servo motor in driving connection with the other two potentiometers and switching means connected to the output side of said adding network and selectively connecting said adding network to said third and fourth servo motors.

References Cited in the file of this patent

UNITED STATES PATENTS

| | | |
|---|---|---|
| 2,385,334 | Davey | Sept. 25, 1945 |
| 2,560,527 | Dehmel | July 10, 1951 |
| 2,588,763 | Reilly et al. | Mar. 11, 1952 |
| 2,686,099 | Bomberger et al. | Aug. 10, 1954 |
| 2,811,788 | Gallo | Nov. 5, 1957 |
| 2,839,747 | Gray | June 17, 1958 |
| 2,882,602 | Gray et al. | Mar. 21, 1959 |

OTHER REFERENCES

Product Engineering ("Mechanical Computing Mechanism—III," by Reid and Stromback) October 1949, pp. 128 and 129 relied on.

Johnson ("Analog Computer Techniques"), McGraw-Hill, 1956, New York. Pages 77–81 relied on.